United States Patent
Lee

(10) Patent No.: US 6,589,073 B2
(45) Date of Patent: Jul. 8, 2003

(54) POWER CENTER ASSEMBLY HAVING ELECTRICAL CONNECTION-PROTECTION AND OPTIONAL DETACHABLE SURFACE MOUNT

(75) Inventor: Kendrew Lee, Fremont, CA (US)

(73) Assignee: Monster Cable Products, Inc., Brisbane, CA (US)

( * ) Notice: Subject to any disclaimer, the term of this patent is extended or adjusted under 35 U.S.C. 154(b) by 0 days.

(21) Appl. No.: 09/922,302

(22) Filed: Aug. 3, 2001

(65) Prior Publication Data

US 2002/0037662 A1 Mar. 28, 2002

Related U.S. Application Data

(63) Continuation of application No. 09/675,107, filed on Sep. 28, 2000.

(51) Int. Cl.[7] ............................................... H01R 13/60
(52) U.S. Cl. ..................................... 439/535; 439/540.1
(58) Field of Search ................................. 439/535, 538, 439/536, 537, 540.1, 652, 653, 654, 954, 650, 651, 534; 379/454; 248/225.11, 221.11, 221.12

(56) References Cited

U.S. PATENT DOCUMENTS

| 4,369,340 A | * | 1/1983 | Beatenbough ........... 179/146 R |
| 4,411,485 A | * | 10/1983 | Wiseheart et al. .......... 439/343 |
| 5,398,157 A | * | 3/1995 | Paul ........................... 361/684 |
| 5,516,298 A | * | 5/1996 | Smith ......................... 439/131 |
| 5,906,517 A | * | 5/1999 | Crane et al. ................ 439/654 |
| 6,179,665 B1 | * | 1/2001 | Rossman et al. ........... 439/654 |
| 6,229,691 B1 | * | 5/2001 | Tanzer et al. ............... 361/622 |
| 6,234,812 B1 | * | 5/2001 | Ivers et al. ................. 439/131 |

* cited by examiner

*Primary Examiner*—Ross Gushi
(74) *Attorney, Agent, or Firm*—LaRiviere, Grubman & Payne, LLP

(57) ABSTRACT

A power center assembly having a hooded member for protecting an electrical connection between a peripheral device plug and its respective outlet and a mount member for detachably mounting the power center to a surface. In particular, a power center assembly is provided having a member for protecting an electrical connection between a plug and its outlet, such as a hooded feature, and an optional member for detachably mounting the power center to a surface, such as a surface-mountable bracket. Such bracket may be affixed to the surface by a fastener such as a screw, a bolt, a pin, a nail, or a hook. For example, mountable surfaces include, but are not limited to a wall, a floor, and a workbench surface.

14 Claims, 7 Drawing Sheets

US 6,589,073 B2

POWER CENTER ASSEMBLY HAVING ELECTRICAL CONNECTION-PROTECTION AND OPTIONAL DETACHABLE SURFACE MOUNT

RELATED APPLICATION(S)

This application is a continuation application of co-pending U.S. patent application Ser. No. 09/675,107, entitled POWER CENTER ASSEMBLY HAVING ELECTRICAL CONNECTION-PROTECTION AM) OPTICAL DETACHABLE SURFACE MOUNT, filed Sep. 28, 2000, by the same Applicant, which is, in turn, related to U.S. Design Pat. No. USD443,249S, filed Sep. 26, 2000, and issued Jun. 5, 2001.

TECHNICAL FIELD

The present invention relates to power outlets or power centers. More particularly, the present invention relates to a power center having specialized housing. Even more particularly, the present invention relates to power centers having a form of electrical connection-protection and a member for detachably mounting the power center to a surface.

BACKGROUND OF THE INVENTION

The current state of the art in plug strips involves a plurality of outlets surrounded by a housing member where the electrical connection between a plurality of plugs and a plurality of respective outlets is left unprotected. As such, several problems are experienced: (1) ready dislodgement of the plug from its outlet by external forces (e.g., torque on the plug from strong drafts or from objects physically contacting the plug), (2) particulate contamination in the interstices between the plug and its outlet (e.g., dust, fibers, sawdust), (3) fluid contamination in the interstices between the plug and its outlet (e.g., oxidation at or shorting of electrical connection due to spilled beverages, flooding, diamond saw water), and (4) embrittling incident ultraviolet radiation upon the plug (e.g., cracking of polymer plug covering by sunlight). Thus, a long-felt need for a power center assembly which provides superior electrical connection-protection, and, in particular, for a power center assembly having a practical cost-effective means for protecting the electrical connection and detachably mounting the power center to any surface is seen to exist.

BRIEF SUMMARY OF THE INVENTION

Accordingly, the present invention provides a power center assembly having means for protecting an electrical connection between a peripheral device plug and its respective outlet and means for detachably mounting the power center assembly to a surface. In particular, the present invention provides a power center assembly having a member for protecting the electrical connection between at least one plug and at least one respective outlet, such as a hooded feature, and an optional member for detachably mounting the power center to a surface, a mount member such as a surface-mountable bracket. Such mount member may be affixed to the surface by a fastener such as a screw, a bolt, a pin, a nail, or a hook. For example, mountable surfaces include, but are not limited to, a wall, a floor, and a workbench surface.

Other features of the present invention are disclosed, or are apparent in the section entitled "DETAILED DESCRIPTION OF THE INVENTION."

Reference numbers refer to the same or equivalent parts of the present invention throughout the several figures of the drawings.

DETAILED DESCRIPTION OF THE INVENTION

Figure 1:
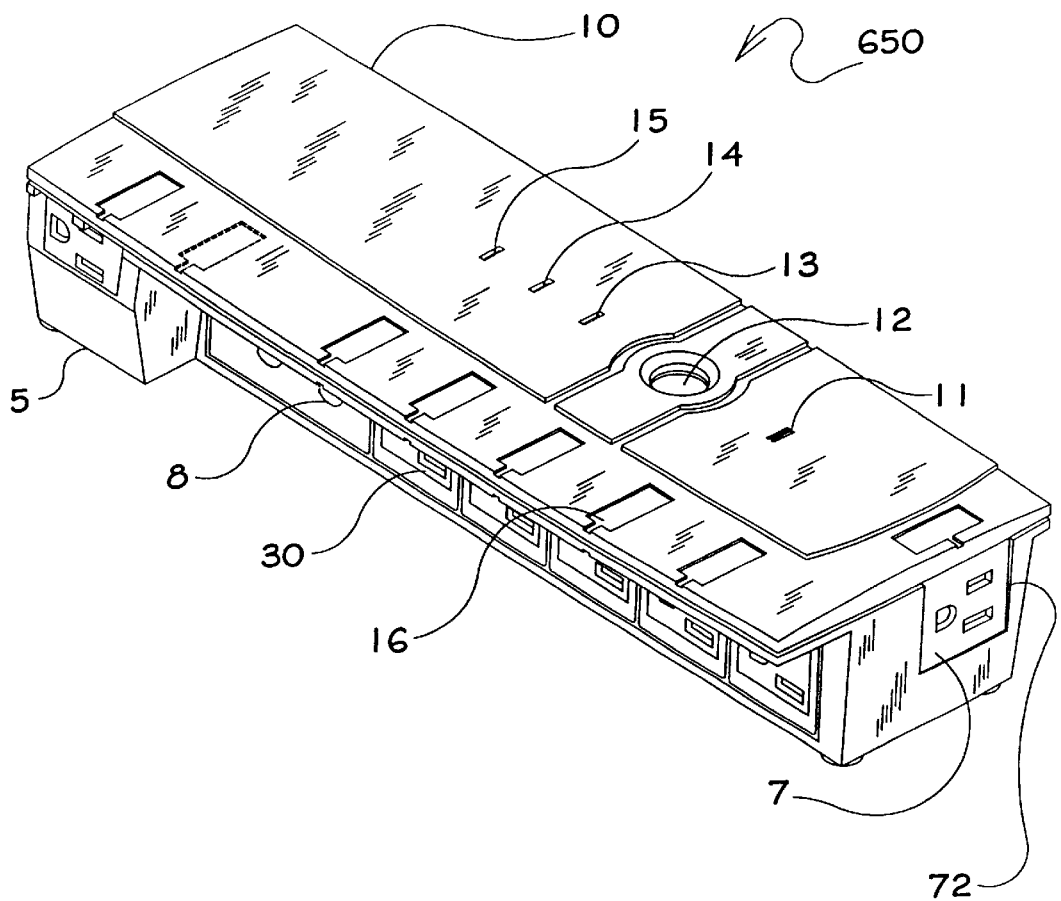
FIG. 1 is a perspective view of a first embodiment of a power center assembly having the hood member for protecting the electrical connection between the at least one plug and the at least one respective outlet, in accordance with the present invention.

FIG. 1 is a perspective view of a first embodiment power center assembly 650 having a housing member 5, a hood member 10 for protecting an electrical connection between at least one plug and at least one respective outlet 30, in accordance with the present invention. The housing member 5 may have formed therein at least one opening 8 for accommodating at least one coaxial cable connector and an opening 72 for accommodating at least one power transformer outlet 7. The hood member 10 may have formed therein at least one labeling well 16 and at least one opening formed there-through for accommodating at least one power strip indication feature selected from a group of power strip features consisting essentially of an audible alarm 11, an on/off button 12, a ground indicator 13, a current indicator (wiring fault) 14, and a surge protection indicator 15.

Figure 2:
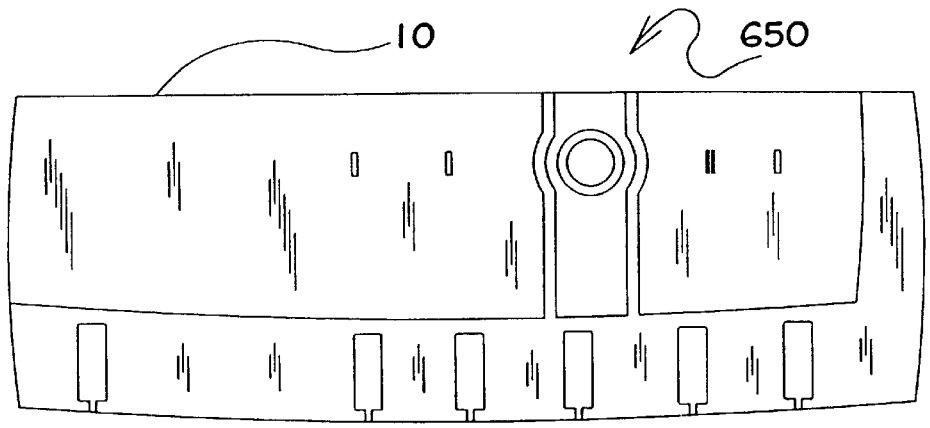
FIG. 2 is a plan view of the first embodiment of the power center assembly having the hood member for protecting the electrical connection between the at least one plug and the at least one respective outlet, in accordance with the present invention, as depicted in FIG. 1.

FIG. 2 is a plan view of the first embodiment of the power center assembly 650 having the housing member 5 and the hood member 10 for protecting the electrical connection between the at least one plug and the at least one respective outlet, in accordance with the present invention, as depicted in FIG. 1.

Figure 3:
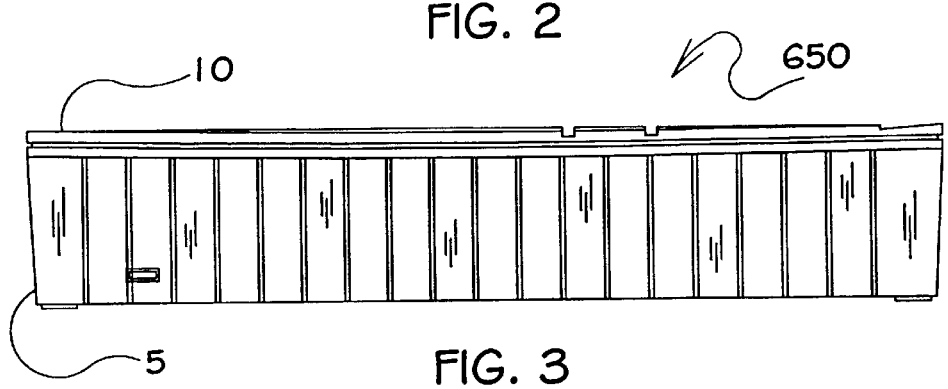
FIG. 3 is a rear view of the first embodiment of the power center assembly having the hood member for protecting the electrical connection between the at least one plug and the at least one respective outlet, in accordance with the present invention, as depicted in FIG. 1.

FIG. 3 is a rear view of the first embodiment of the power center assembly 650 having the housing member 5 and the hood member 10 for protecting the electrical connection between the at least one plug and the at least one respective outlet, in accordance with the present invention, as depicted in FIG. 1.

Figure 4:
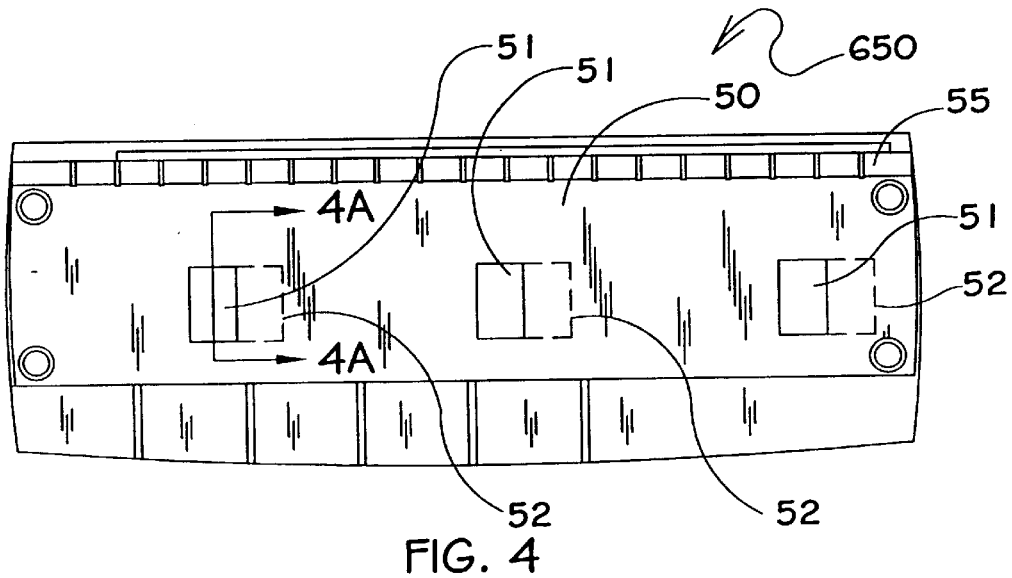
FIG. 4 is an underside view of the first embodiment of the power center assembly having the hood member for protecting the electrical connection between the at least one plug and the at least one respective outlet, in accordance with the present invention, as depicted in FIG. 1.

FIG. 4 is an underside view of the first embodiment of the power center assembly 650 illustrating the housing member 5 having a bottom surface 50, a tapered rear side 55, at least one slot 51 having a cross-section located at line 4A—4A, and at least one location for inserting a mating flange 52 (indicated by dotted lines) of a mount member, in accordance with the present invention, as depicted in FIG. 1.

Figure 4A:
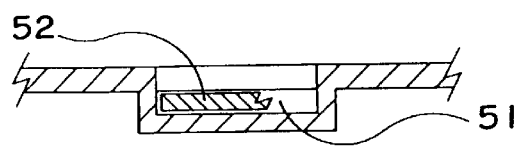
FIG. 4A is a cross-sectional view of the first embodiment of the power center assembly, showing a flange inserted into a slot as a mounting mechanism, in accordance with the present invention, as depicted in FIG. 1.

FIG. 4A is a cross-sectional view of the first embodiment of the power center assembly 650, taken along line 4A—4A, showing a flange 52 being inserted into a slot 51 as a mounting mechanism, in accordance with the present invention, as depicted in FIG. 1.

Figure 5:
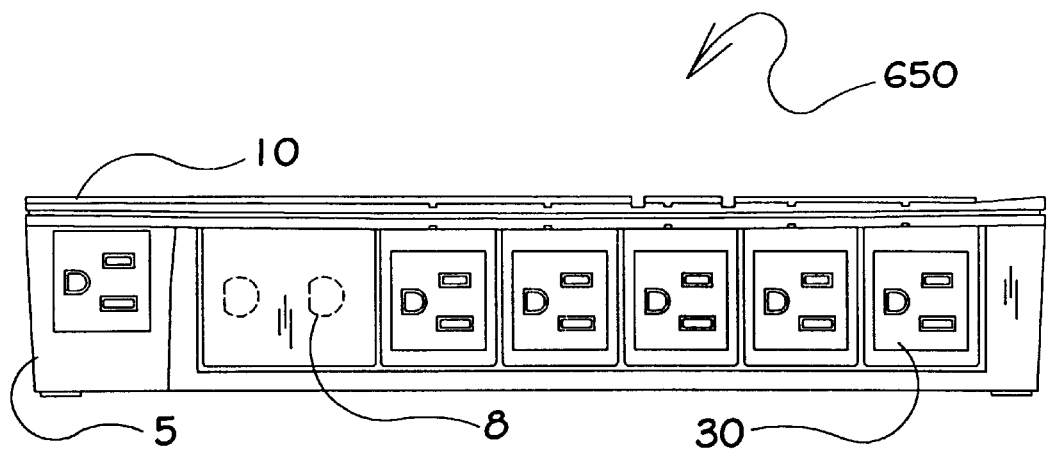
FIG. 5 is a frontal view of the first embodiment of the power center assembly having the hood member for protecting the electrical connection between the at least one plug and the at least one respective outlet, in accordance with the present invention, as depicted in FIG. 1.

FIG. 5 is a frontal view of the first embodiment of the power center assembly 650 having the housing member 5 and the hood member 10 for protecting the electrical connection between the at least one plug and the at least one respective outlet 30, in accordance with the present invention, as depicted in FIG. 1. The housing member 5 may have at least one optional opening 8 for accommodating at least one coaxial cable.

Figure 6:
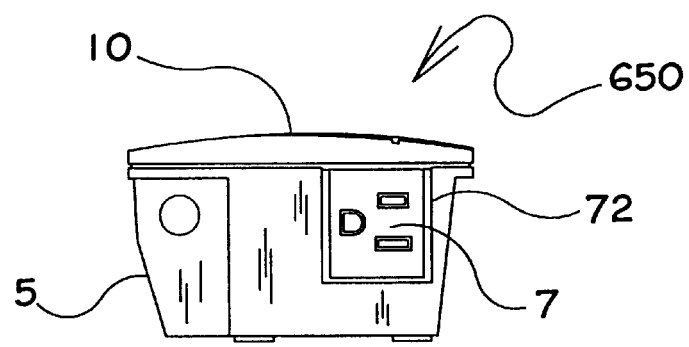
FIG. 6 is a side view of the first embodiment of the power center assembly having the hood member for protecting the electrical connection between the at least one plug and the at least one respective outlet, in accordance with the present invention, as depicted in FIG. 1.

FIG. 6 is a side view of the first embodiment of the power center assembly 650 having the hood member 10 for protecting the electrical connection between the at least one plug and the at least one respective outlet 30 and a housing member 5 with at least one power transformer outlet 7, in accordance with the present invention, as depicted in FIG. 1.

Figure 7:
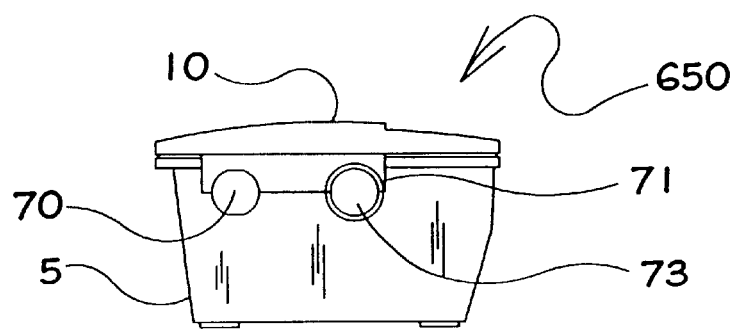
FIG. 7 is a corresponding side view of the first embodiment of the power center assembly having the hood member for protecting the electrical connection between the at least one plug and the at least one respective outlet, in accordance with the present invention, as depicted in FIG. 1.

FIG. 7 is a corresponding side view of the first embodiment of the power center assembly 650 having the housing member 5 and the hood member 10 for protecting the electrical connection between the at least one plug and the at least one respective outlet, in accordance with the present invention, as depicted in FIG. 1. The housing member 5 has an opening 70 for accommodating a rubber boot and an opening 71 formed there-through for accommodating a reset button 73.

Figure 8:
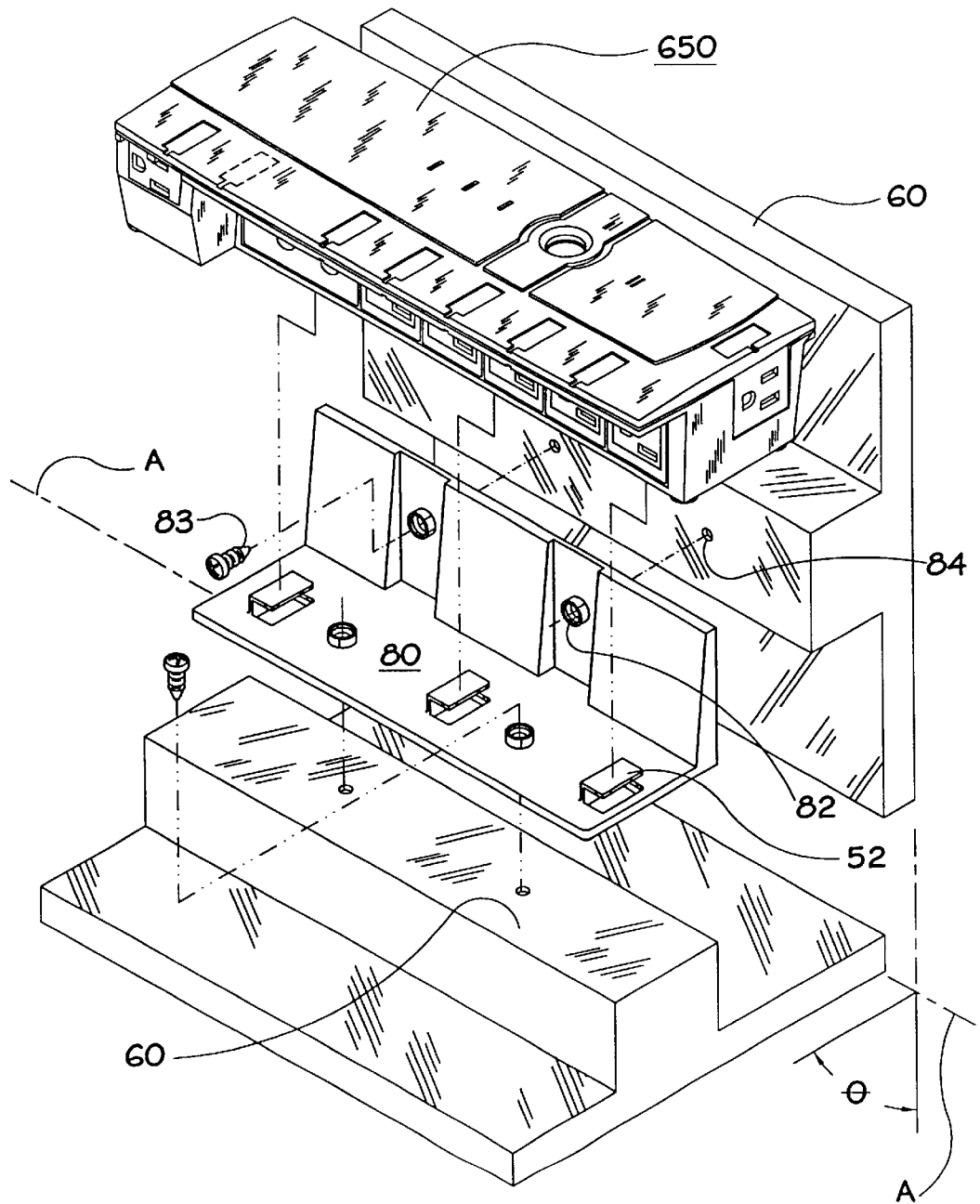
FIG. 8 is a perspective view of the first embodiment of the power center assembly, having a hood member for protecting an electrical connection between at least one plug and at least one respective outlet, in relation to a mount member and at least one mountable surface, in accordance with the present invention.

FIG. 8 is a perspective view of the first embodiment of the power center assembly 650, having a hood member for protecting an electrical connection between at least one plug and at least one respective outlet, in relation to a mount member 80 and at least one mountable surface 60, in accordance with the present invention. At least one through-hole 82 is formed through the mount member 80 for accommodating at least one fastener 83. The at least one fastener 83 affix the mount member 80 onto the at least one mountable surface 60 through at least one tap 84 formed therein for facilitating affixation of the mount member 80. The mount member 80 may be affixed to a bench-top (e.g., θ=0°) or to a wall (e.g., θ=90°). The mount member 5 is then slidably mounted onto the mount member 80 by inserting the at least one flange 52 into the at least one slot 51.

Figure 9:
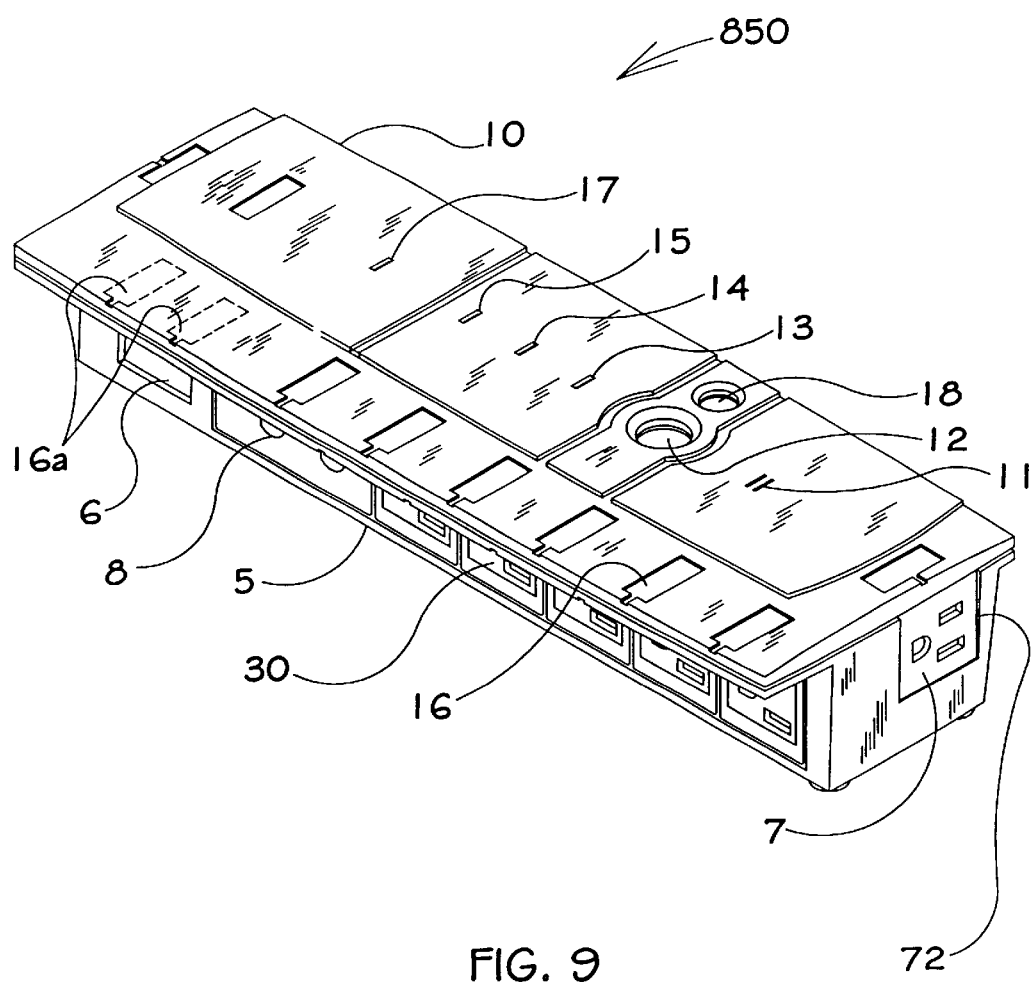
FIG. 9 is a perspective view of a second embodiment of the power center assembly having a hood member for protecting an electrical connection between at least one plug and at least one respective outlet, in accordance with the present invention.

FIG. 9 is a perspective view of a second embodiment of the power center assembly 850 having a hood member 10 for protecting an electrical connection between at least one plug and at least one respective outlet 30, in accordance with the present invention. The housing member 5 may have formed therein at least one opening 8 for accommodating at least one coaxial cable connector, at least one opening 6 for accommodating at least one phone/modem jack, and an opening 72 for accommodating at least one power transformer outlet 7. The hood member 10 may have formed therein at least one labeling well 16 and at least one opening formed there-through for accommodating at least one power strip indication feature selected from a group of power strip features consisting essentially of an audible alarm 11, an on/off button 12, a ground indicator 13, a current indicator (wiring fault) 14, a surge protection indicator 15, a clean power indicator 17, and a reset button 18.

Figure 10:
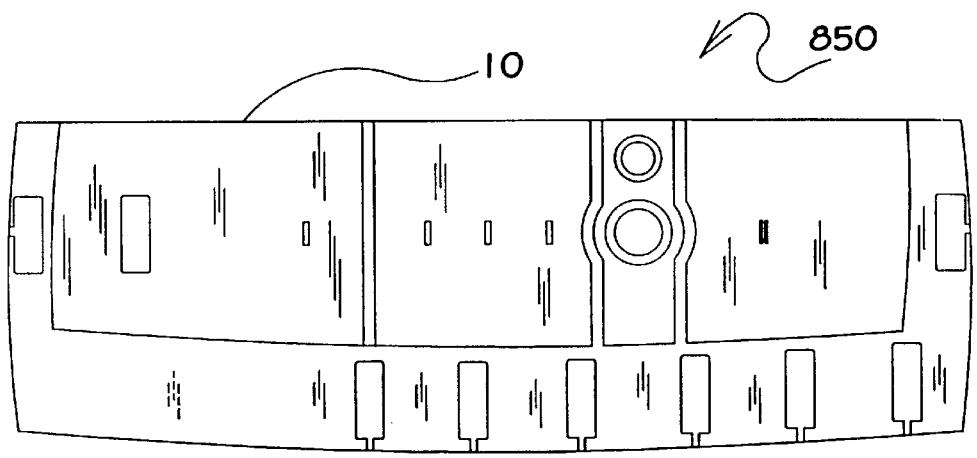
FIG. 10 is a plan view of the second embodiment of the power center assembly having the hood member for protecting the electrical connection between the at least one plug and the at least one respective outlet, as depicted in FIG. 8.

FIG. 10 is a plan view of the second embodiment of the power center assembly 850 having the housing member 5 and the hood member 10 for protecting the electrical connection between the at least one plug and the at least one respective outlet, in accordance with the present invention, as depicted in FIG. 8.

Figure 11:
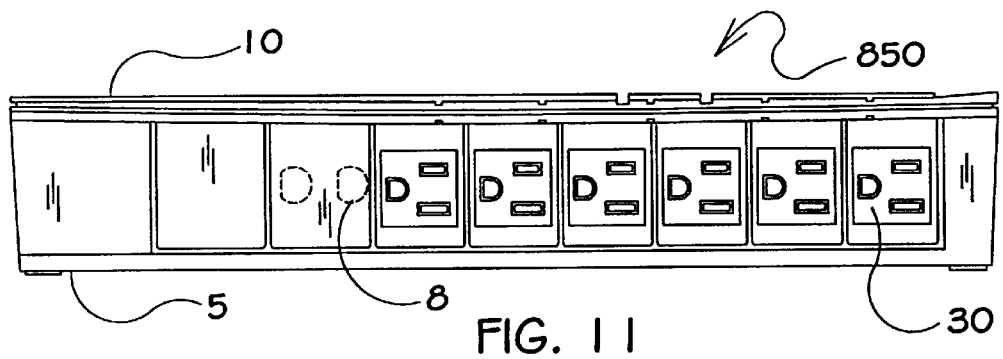
FIG. 11 is a frontal view of the second embodiment of the power center assembly having the hood member for protecting the electrical connection between the at least one plug and the at least one respective outlet, in accordance with the present invention, as depicted in FIG. 8.

FIG. 11 is a frontal view of the second embodiment of the power center assembly 850 having the housing member 5 and the hood member 10 for protecting the electrical connection between the at least one plug and the at least one respective outlet 30, in accordance with the present invention, as depicted in FIG. 8. The housing member 5 may have at least one optional opening 8 for accommodating at least one coaxial cable connector.

Figure 12:
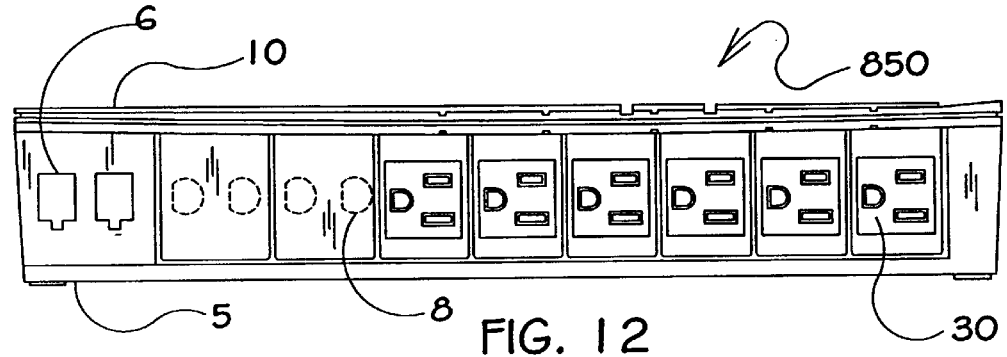
FIG. 12 is a frontal view of an alternative second embodiment of the power center assembly having the hood member for protecting the electrical connection between the at least one plug and the at least one respective outlet, in accordance with the present invention, as depicted in FIG. 8.

FIG. 12 is a frontal view of an alternative second embodiment of the power center assembly 850 having the housing member 5 and the hood member 10 for protecting the electrical connection between the at least one plug and the at least one respective outlet, in accordance with the present invention, as depicted in FIG. 8. The housing member 5 may have at least one optional opening 8 for accommodating at least one coaxial cable connector and at least one opening 6 for accommodating at least one phone/modem jack.

Figure 13:
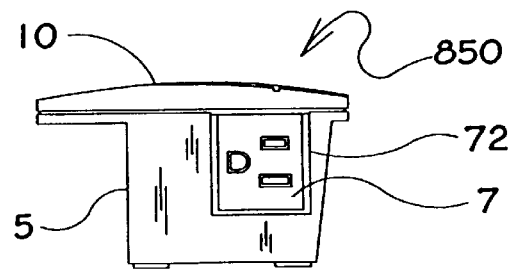
FIG. 13 is a side view of the second embodiment of the power center assembly having the hood member for protecting the electrical connection between the at least one plug and the at least one respective outlet, in accordance with the present invention, as depicted in FIG. 8.

FIG. 13 is a side view of the second embodiment of the power center assembly 850 having the housing member 5 and the hood member 10 for protecting the electrical connection between the at least one plug and the at least one respective outlet, in accordance with the present invention, as depicted in FIG. 8. The housing member 5 has at least one opening 72 for accommodating at least one power transformer outlet 7.

Figure 14:
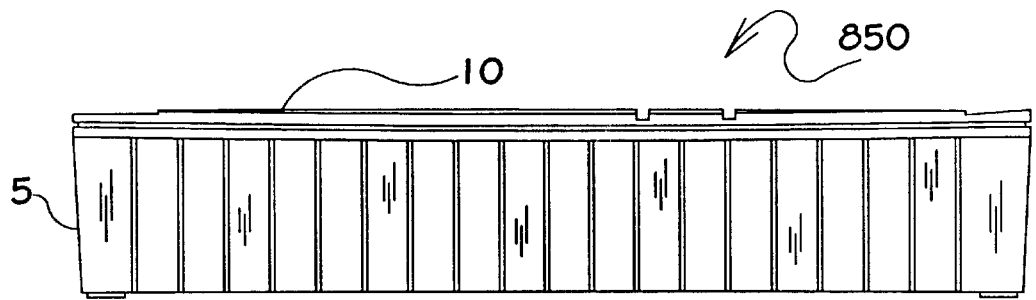
FIG. 14 is a rear view of the second embodiment of the power center assembly having the hood member for protecting the electrical connection between the at least one plug and the at least one respective outlet, in accordance with the present invention, as depicted in FIG. 8.

FIG. 14 is a rear view of the second embodiment of the power center assembly 850 having the housing member 5 and the hood member 10 for protecting the electrical connection between the at least one plug and the at least one respective outlet, in accordance with the present invention, as depicted in FIG. 8.

Figure 15:
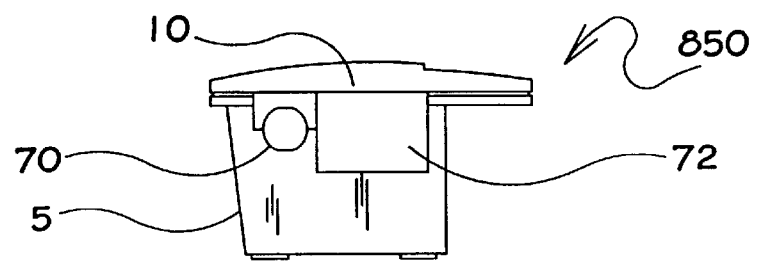
FIG. 15 is a corresponding view of the second embodiment of the power center assembly having the hood member for protecting the electrical connection between the at least one plug and the at least one respective outlet, in accordance with the present invention, as depicted in FIG. 8.

FIG. 15 is a corresponding view of the second embodiment of the power center assembly 850 having the housing member 5 and the hood member 10 for protecting the electrical connection between the at least one plug and the at least one respective outlet, in accordance with the present invention, as depicted in FIG. 8. The housing member 5 has an opening 70 for accommodating a rubber boot and an opening 72 for accommodating the at least one power transformer outlet 7.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims. Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, it should be readily apparent to those of ordinary skill in the art that various changes and modifications in form, semiconductor material, and fabrication material detail may be made without departing from the spirit and scope of the inventions as set forth in the appended claims. No claim herein is to be construed under the provisions of 35 U.S.C. 112, sixth paragraph, unless the element is expressly recited using the phrase "means for."

What is claimed:

1. A power center assembly, comprising:
   a. a power strip,
      said power strip having a housing member and at least one outlet for powering at least one peripheral device,
      said housing member having a bottom surface;
   b. mechanical means for protecting mechanical and electrical connection of said at least one peripheral device to said power strip; and
   c. means for detachably mounting said power strip and said mechanical protecting means onto a mounting surface,
   wherein said detachably mounting means comprises a mount member,
   wherein said mount member comprises a configuration selected from a group consisting essentially of a flat plate, and an L-shape,
   wherein said mount member mounts to said mounting surface selected from a group consisting essentially of a vertical surface and a horizontal surface,
   wherein said mount member aligns said protecting means parallel to said mounting surface,
   wherein said mounting surface, has a mating surface,
   wherein said mating surface comprises means for slidably mounting said power strip onto said mount member,
   wherein said bottom surface of said housing member comprises means for slidably mounting said mount member into said power strip,
   wherein said mount member mating surface slidably mounting means comprises at least one flange being formed on said mating surface,
   wherein said housing member bottom surface slidably mounting means comprises at least one slot being formed in said bottom surface, and
   wherein said at least one flange is slidably mounted into said at least one slot.

2. A power center assembly, as recited in claim 1, wherein said housing member further comprises an opening for accommodating a rubber boot, said rubber boot having a power cord coaxially disposed therein, and said power cord being electrically coupled to a power source.

3. A power center assembly, as recited in claim 1, further comprising: means for fastening said detachably slidably mounting (quick-connecting/disconnecting) means to said surface.

4. A power center assembly, as recited in claim 3,
   wherein at least one through-hole is formed through said mount member for facilitating fastening of said mount member onto said surface, and
   wherein said fastening means comprises a fastener selected from a group of fasteners consisting essentially of:
      a. at least one screw,
      b. at least one bolt,
      c. at least one nail,
      d. at least one pin, and
      e. at least one hook.

5. A power center assembly, as recited in claim 1,
   wherein said mechanical protecting means comprises a hooded feature, and
   wherein said hooded feature is cantilevered over said at least one outlet for electrical connection-protection when said at least one plug is placed in electrical contact with said at least one respective outlet.

6. A power center assembly, as recited in claim 5, wherein said hooded feature is provided in a configuration selected from a group of configurations consisting of:
   a. an integral formation of said hooded feature with said housing member, and
   b. an independent formation of said hooded feature with said housing member.

7. A power center assembly, comprising:
a. a power strip,
    said power strip having a housing member and at least one outlet for powering at least one peripheral device, and
    said housing member having a bottom surface;
b. a hooded member for protecting an electrical connection between at least one plug of said at least one peripheral device and at least one respective outlet of said at least one outlet; and
c. a mount member for detachably mounting said power strip and said hooded member onto a mounting surface,
    said mount member mounting to the mounting surface selected from a group consisting essentially of a vertical surface and a horizontal surface,
    said mount member aligning said hooded member parallel to said mounting surface,
wherein said housing member comprises at least one opening for accommodating at least one element selected from a group consisting essentially of a rubber boot, a power transformer outlet, a coaxial cable connector, and a phone/modem jack,
wherein said mount member comprises a configuration selected from a group consisting essentially of a flat plate, and an L-shape,
wherein said mount member has a mating surface,
wherein said mating surface comprises means for slidably mounting said power strip onto said mount member,
wherein said bottom surface of said housing member comprises means for slidably mounting said mount member into said power strip,
wherein said mount member mating surface slidably mounting means comprises at least one flange being formed on said mating surface,
wherein said housing member bottom surface slidably mounting means comprises at least one slot being formed in said bottom surface, and
wherein said at least one flange is slidably mounted into said at least one slot.

8. A method for fabricating a power center assembly, comprising the steps of:
a. providing a power strip,
    said power strip having a housing member and at least one outlet for powering at least one peripheral device,
    said housing member having a bottom surface;
b. providing mechanical means for protecting mechanical and electrical connection of said at least one peripheral device to said power strip; and
c. providing means for detachably mounting said power strip and said mechanical protecting means onto a mounting surface,
wherein said detachably mounting means comprises a mount member,
wherein said mount member mounts to the mounting surface selected from a group consisting essentially of a vertical surface and a horizontal surface,
wherein said mount member aligns said protecting means parallel to said mounting surface,
wherein said mount member comprises a configuration selected from a group consisting essentially of a flat plate, and an L-shape,
wherein said mount member has a mating surface,
wherein said mating surface comprises means for slidably mounting said power strip onto said mount member,
wherein said bottom surface of said housing member comprises means for slidably mounting said mount member into said power strip,
wherein said mount member mating surface slidably mounting means comprises at least one flange being formed on said mating surface,
wherein said housing member bottom surface slidably mounting means comprises at least one slot being formed in said bottom surface, and
wherein said at least one flange is slidably mounted into said at least one slot.

9. A method for fabricating a power center assembly, as recited in claim 8,
wherein said housing member further comprises an opening for accommodating a rubber boot,
said rubber boot having a power cord coaxially disposed therein, and
said power cord being electrically coupled to a power source.

10. A method for fabricating a power center assembly, as recited in claim 8, further comprising the step of: providing means for fastening said detachably slidably mounting means to said surface.

11. A method for fabricating a power center assembly, as recited in claim 10,
wherein at least one through-hole is formed through said mount member for facilitating fastening of said mount member onto said surface, and
wherein said fastening means comprises a fastener selected from a group of fasteners consisting essentially of:
a. at least one screw,
b. at least one bolt,
c. at least one nail,
d. at least one pin, and
e. at least one hook.

12. A method for fabricating a power center assembly, as recited in claim 8,
wherein said mechanical protecting means comprises a hooded feature, and
wherein said hooded feature is cantilevered over said at least one outlet for electrical connection-protection when said at least one plug is placed in electrical contact with said at least one respective outlet.

13. A method for fabricating a power center assembly, as recited in claim 12, wherein said hooded feature is provided in a configuration selected from a group of configurations consisting of:
a. an integral formation of said hooded feature with said housing member, and
b. an independent formation of said hooded feature with said housing member.

14. A method for fabricating a power center assembly, comprising the steps of:
a. providing a power strip,
    said power strip having a housing member and at least one outlet for powering at least one peripheral device, and
    said housing member having a bottom surface;
b. providing a hooded member for protecting an electrical connection between at least one plug of said at least one peripheral device and at least one respective outlet of said at least one outlet; and
c. providing a mount member for detachably mounting said power strip and said hooded member onto a mounting surface, said mount member mounting to the mounting surface selected from a group consisting essentially of a vertical surface and a horizontal surface, said mount member aligning said hooded member parallel to said mounting surface, wherein said housing member comprises at least one opening for accommodating at least one element selected from a group consisting essentially of a rubber boot, a power transformer outlet, a coaxial cable connector, and a phone/modem jack, wherein said mount member comprises a configuration selected from a group consisting essentially of a flat plate, and an L-shape, wherein said mount member has a mating surface, wherein said mating surface comprises means for slidably mounting said power strip onto said mount member, wherein said bottom surface of said housing member comprises means for slidably mounting said mount member into said power strip, wherein said mount member mating surface slidably mounting means comprises at least one flange being formed on said mating surface, wherein said housing member bottom surface slidably mounting means comprises at least one slot being formed in said bottom surface, and wherein said at least one flange is slidably mounted into said at least one slot.

* * * * *